United States Patent

Perkins

[15] 3,691,361
[45] Sept. 12, 1972

[54] AREA NAVIGATION SYSTEM FOR AUTOMATICALLY SELECTING WAYPOINTS ON THE TRACK AND LYING AT A RIGHT ANGLE FROM A MASTER STATION

[72] Inventor: Carl Stuart Perkins, Oak Brook, Ill.
[73] Assignee: Butler National Corporation, Oak Brook, Ill.
[22] Filed: Nov. 13, 1970
[21] Appl. No.: 89,364

[52] U.S. Cl. ..........235/150.27, 235/150.2, 235/186, 343/112 D, 343/112 C
[51] Int. Cl. ................................................G06g 7/78
[58] Field of Search.........235/150.2, 150.23, 150.26, 235/150.261, 150.27; 343/107, 112 D, 112 C, 112 R

[56] References Cited

UNITED STATES PATENTS 3,534,399 10/1970 Hirsch...................235/150.27
3,581,073 5/1971 Visher...................235/150.26

Primary Examiner—Felix D. Gruber
Attorney—Hill, Sherman, Meroni, Gross & Simpson

[57] ABSTRACT

An area navigation system which provides for the automatic selection of waypoints on the track at a point which is at right angles from the track to the master station. Means are provided for determining the distance from the aircraft to the waypoint and the distance of the waypoint from the master station and these signals are utilized to automatically set the coordinates of the waypoint into the area navigation equipment.

7 Claims, 2 Drawing Figures

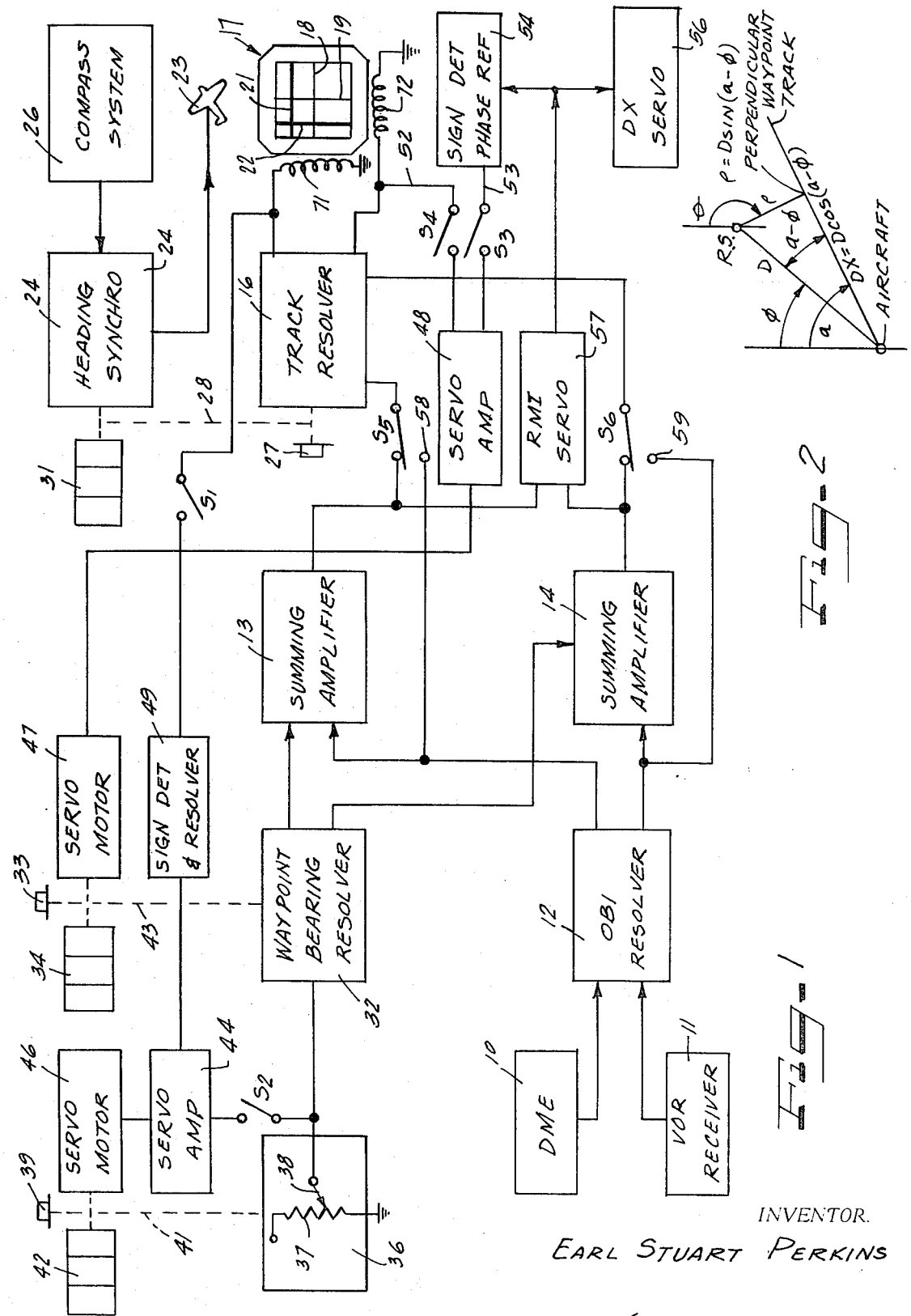

AREA NAVIGATION SYSTEM FOR AUTOMATICALLY SELECTING WAYPOINTS ON THE TRACK AND LYING AT A RIGHT ANGLE FROM A MASTER STATION

CROSS-REFERENCE TO RELATED APPLICATIONS AND PATENTS

This invention is related to U.S. Pat. No. 3,414,901 entitled AIRCRAFT NAVIGATION SYSTEM and to co-pending applications of EARL STUART PERKINS entitled AUTOMATIC WAYPOINT, Ser. No. 824,164 filed May 13, 1969 now U.S. Pat. No. 3,652,873 and AUTOMATIC TRACK, Ser. No. 816,302 filed April 15, 1969, now Pat. No. 3,621,211.

BACKGROUND OF THE INVENTION

1. Field of the Invention

This invention relates in general to aircraft navigation systems and in particular to area navigation systems.

2. Description of the Prior Art

Area navigation systems in which a pilot may select any point as a waypoint rather than being limited to locations which have navigation transmitting facilities have recently come into use as shown for example by U.S. Pat. No. 3,414,901. Co-pending application Ser. No. 816,302 provides for automatic servo control of the co-ordinates of a waypoint such that the present position of an aircraft is continuously maintained as the waypoint until such time that it is desired to fix the waypoint after which the fixed waypoint is utilized as the reference in the navigation system.

Co-pending application Ser. No. 824,164 provides for fixing a waypoint on the present track of the aircraft at a fixed distance as of the time of selection. For example, the waypoint might be 150 miles ahead of the aircraft on the track at the time that the waypoint is selected and the area navigation system will then indicate the distance to the waypoint as the aircraft passes down the track.

SUMMARY OF THE INVENTION

The present invention provides a system for automatically selecting a waypoint in an area navigation system which comprises a point on the track of the aircraft which is located on a radial from the station which is at right angles to the track. Such waypoint identified as the "perpendicular waypoint" allows the distance to the nearest point to the ground station to be indicated in the area navigation system at all times and can be utilized as the prime waypoint for each station and allows Great Circle paths or parallels thereto to be traveled over the surface of the earth.

The co-ordinates of the "perpendicular waypoint" are determined from the VOR bearing of the aircraft to the station and from the track angle and the distance of the aircraft from the station. These coordinates allow the $\rho\Theta$ setting of the "perpendicular waypoint" to be automatically set into the area navigation system so that the pilot may continuously monitor his position relative to the "perpendicular waypoint."

Other objects, features and advantage of the invention will be apparent to those skilled in the art from the following description of the annexed sheet of drawings which by way of a preferred embodiment of the invention will illustrate one example of the invention.

BRIEF DESCRIPTION OF THE DRAWINGS

FIG. 1 is a block diagram illustrating the apparatus for automatically establishing the "perpendicular waypoint"; and FIG. 2 is a plan view illustrating the orientationing of the aircraft, the master station and the "perpendicular waypoint."

DESCRIPTION OF THE PREFERRED EMBODIMENT

FIG. 1 illustrates an area navigation system according to this invention which also includes the automatic waypoint feature which allows the automatic selection of a "perpendicular waypoint." The "perpendicular waypoint" is defined as the point along a track which an aircraft is travelling which is on a radial of the master station which crosses the track at right angles. The advantage of utilizing this point is that it can become the prime waypoint for each station and is the closest point of a track parallel to the Great Circle through the station.

The conventional portion of the area navigation system of the invention comprises the DME receiver 10 and VOR receiver 11 which provide outputs to an OBI resolver 12 which resolves the distance and direction signals to the navigation station into Cartesian coordinate signals which appear at the output of the OBI resolver. These outputs are respectively supplied to summing amplifiers 13 and 14 which also receive Cartesian coordinate signals from the waypoint bearing resolver 32. The waypoint bearing resolver 32 has a control shaft 43 with a knob 33 for setting the coordinates of a waypoint which has a particular bearing from the station. An indicator 34 indicates the selected bearing of the waypoint from the station. A waypoint distance potentiometer 36 includes a potentiometer 37 with a wiper contact 38 which may be set by a shaft 41 by a knob 39 to a particular coordinate of the waypoint indicated as $\rho$ in FIG. 2. An indicator 42 indicates the $\rho$ coordinate of the waypoint. The output signal of the waypoint distance potentiometer is supplied to the waypoint bearing resolver. The output of the summing amplifiers 13 and 14 are supplied respectively through switches S5 and S6 to the track resolver 16. The track resolver 16 has a track selecting shaft 28 which may be controlled by the knob 27 to establish a selected track. An indicator 31 indicates the selected track. A heading synchro 24 is connected to the shaft 28 and receives an input from a compass system 26. An area navigation indicator 17 has a pair of meter movements 71 and 72. The meter movement 71 receives the $y$ output of the track resolver 16 and the meter movement 72 receives the $x$ output of the track resolver 16. A horizontal needle 21 is controlled by the meter movement 71 and a vertical needle 22 is controlled by the meter movement 72. Fixed indicia 18 and 19 are printed on the face of the indicator 17 for reference purposes. An aircraft indicia 23 is rotatably supported at the center of the indicator 17 and is positioned by the output of the heading synchro 24. For simplicity the aircraft indicia 23 is shown above the indicator 17 rather than mounted at the center.

The system described so far comprises a conventional area navigation system such as described for example in U.S. Pat. No. 3,414,901. The improvement of the present invention comprises providing a servo motor 46 which is connected to the shaft 41 of the waypoint distance potentiometer 36 to move the wiper contact 38 and which receives an input from a servo amplifier 44. The servo amplifier 44 receives an input from the sign detector and resolver 49. A switch S1 when closed provides the y output of the track resolver 16 to the servo amplifier 44 through the switch S1 and sign detector and resolver 49. A feedback signal is also applied to the servo amplifier 44 through a switch S2 from the wiper contact 38 of the waypoint distance potentiometer 36.

A servo motor 47 is connected to shaft 43 of the waypoint bearing resolver 32 and receives an input from the servo amplifier 48 which receives the x output of the track resolver 16 through switch S4. Servo amplifier 48 also receives an input through switch S3 from a sign detector phase reference 54 through lead 53. An RMI servo 57 supplies an input to the sign detector and phase reference 54 and to a distance to station servo 56. A switch S5 disconnects the track resolver from the output of the summing amplifier 13 and connects it to a contact 58 which is connected to one of the outputs of the omni-bearing resolver 12. Switch S6 disconnects the track resolver 16 from the output summing amplifier 14 and connects the track resolver to a contact 59 which is connected to the other output of the omni-bearing indicator resolver 12.

When the switches S1–S6 are in the position shown in FIG. 1, the area navigation system operates in the conventional manner utilizing the waypoint established and indicated in the indicators 42 and 34. When it is desired to automatically establish a waypoint which is along the track and lies on a radial from the radio station which crosses the track at 90°, the switches S1–S6 are moved to their second position such that switches S1, S2, S3, S4 close, the switches S5 and S6 move to engage contacts 58 and 59. When this occurs, the servo motors 46 and 47 will automatically set the waypoint distance potentiometer 36 and the waypoint bearing resolver 32 to the correct coordinates of the "perpendicular waypoint."

The pilot allows the switches to remain in this position for selecting the automatic waypoint until the indicators 42 and 34 remain stationary which indicates that the proper coordinates of the "perpendicular waypoint" have been established and then moves the switches S1–S6 back to the positions indicated in FIG. 1, at which time the area navigation system will continuously indicate the aircraft's position relative to the "perpendicular waypoint" which has been established. It is to be realized that the switches S1–S6 may be ganged together so that they simultaneously are actuated by the pilot.

To understand the manner in which the "perpendicular waypoint" is established, reference may be made to FIG. 2. The aircraft's position is indicated relative to the radio station as having a VOR bearing $\phi$ and a distance aD as determined by the distance measuring receiver. The aircraft is on a track $a$. The point on the track which is on a radial of the radio station which crosses the track at a right angle is identified as the perpendicular waypoint. The distance of the perpendicular waypoint from the radio station is indicated by $\rho$. Thus the perpendicular waypoint coordinates of the perpendicular waypoint relative to the radio station is are defined by the coordinates $\rho\phi$. The angle between the radial of the aircraft and the track is $a\text{-}\phi$ and from simple trigometric operation $\rho = D\sin(a-\phi)$. DX is the distance from the aircraft to the perpendicular waypoint which is equal to $D\cos(a-\phi)$.

The apparatus in FIG. 1, when switches S1, S2, S3 and S4 are closed and switches S5 and S6 engage respectively contacts 58 and 59, produces output of the track resolver 16 of $D\sin(a-\phi)$ on the output which goes to the meter movement 71 and an output of $D\cos(a-\phi)$ on the output which goes to the meter movement 72. The output to the meter movement 71 is equal to $\rho$ as shown above and the servo motor 46 is driven by the servo amplifier 44 through the sign detector and resolver 49 and switch S1 to position the $\rho$ coordinate of the perpendicular waypoint to $D\sin(a-\phi)$. Feedback from the distance potentiometer wiper is applied to servo amplifier 44 through the switch S2. Thus the waypoint potentiometer will be driven by the servo motor 46 to the correct value of $\rho$ for the perpendicular waypoint.

At the same time, when the switches S1, S2, S3, s4 close and switches S5 and S6 engage contacts 58 and 59, the RMI servo 57 produces an output equal to DX, the distance from the aircraft to the perpendicular waypoint, which is compared with the output $D\cos(a-\phi)$ from the track resolver appearing on the output which goes to meter movement 72 in the servo amplifier 48 and the motor 47 is driven until the two inputs to the servo amplifier are equal, thus, positioning the waypoint bearing resolver 32 to the correct coordinate data of the perpendicular waypoint from the ground station R.S.

When the servos 46 and 47 come to a stop, the switches S1, S2, S3, S4 are again opened and the switches S5 and S6 are moved out of engagement with the contacts 58 and 59 to the position shown in FIG. 1 and the area navigation system operates conventionally and continuously indicates the aircraft's position relative to the selected perpendicular waypoint.

Thus, it is seen that this invention allows the coordinates of a perpendicular waypoint on a track to be automatically selected without calculation and the aircraft may then be flown relative to the perpendicular waypoint.

Although the invention has been described with respect to preferred embodiments, it is not to be so limited as changes or modifications may be made which are within the full intent and scope as defined by the appended claims.

I claim as my invention:

1. A navigation system for a craft including:
   an area navigation computer which incorporates track selecting means;
   said computer receiving radiant energy from a ground station which energy is indicative of position and for computing signals corresponding to distance and bearing of a waypoint;
   means for establishing signals indicative of distance and bearing coordinates of a selected waypoint;
   a first means selectively connected to said means for establishing signals indicative of the bearing coordinate and receiving first and second output signals from said air navigation computer for changing the bearing coordinates so that the waypoint is caused to lie on the selected track; and second means selectively connected to said means for establishing said distance coordinate signal and receiving a third output of said air navigation computer for changing the distance coordinate signal of the waypoint so that said waypoint is caused to lie on a bearing from said ground station which is at right angles to said selected track.

2. A navigation system according to claim 1 wherein said first and second output signals of said area navigation computer furnished to said first means comprise a first signal proportional to the aircraft distance to said waypoint and a second signal which is equal to a product of the distance of the aircraft to the ground station and the cosine of the angle equal to the difference between the selected track angle and the bearing to said ground station.

3. A navigation system according to claim 1 wherein said third output signal of said area navigation computer furnished to said second means comprises a signal proportional to the product of the distance of the aircraft to the ground station and sine of the angle equal to the difference between the track and the bearing to said ground station.

4. A navigation system according to claim 2 comprising first switching means for connecting said first and second signals to said first means.

5. A navigation computer according to claim 3 comprising second switching means for connecting said third signal to said second means.

6. A navigation system according to claim 1 wherein said area navigation computer includes a track resolver and an omnibearing resolver and a third switching means for connecting the outputs of said omnibearing resolver to said track resolver when said first and second means are connected to said means for establishing said bearing and distance coordinates.

7. In a navigation system for a craft having an area navigation computer, the method of automatically defining a waypoint on a selected track which lies on the right angle bearing from a ground station comprising the steps of:

1. generating signals indicative of distance and bearing coordinates of a waypoint;
2. generating a signal corresponding to the bearing angle of a selected track;
3. varying the distance coordinate signal of said waypoint until it equals the product of the distance to ground station signal and the signal equal to the sine of the angle determined by the difference between the selected track and the bearing to said ground station; and
4. varying the bearing coordinate of said waypoint until the distance to waypoint is equal to the product of the distance of the craft to the ground station and the cosine of the difference between the selected track and the bearing to said ground station.

* * * * *